(12) United States Patent
Komissarov et al.

(10) Patent No.: US 11,182,976 B2
(45) Date of Patent: Nov. 23, 2021

(54) DEVICE FOR INFLUENCING VIRTUAL OBJECTS OF AUGMENTED REALITY

(71) Applicant: DEVAR ENTERTAINMENT LIMITED, Nicosia (CY)

(72) Inventors: Andrey Valeryevich Komissarov, Tula (RU); Anna Igorevna Belova, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 0 days.

(21) Appl. No.: 17/075,082

(22) Filed: Oct. 20, 2020

(65) Prior Publication Data

US 2021/0035371 A1 Feb. 4, 2021

Related U.S. Application Data

(63) Continuation-in-part of application No. 16/307,647, filed as application No. PCT/RU2017/050042 on May 25, 2017, now abandoned.

(30) Foreign Application Priority Data

Jun. 6, 2016 (RU) .......................... RU2016122239

(51) Int. Cl.
*G06T 19/00* (2011.01)
*G06K 9/00* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
CPC ......................... G02B 27/0093; G02B 27/017; G06T 19/006; G06T 7/50; G06F 3/011;
(Continued)

(56) References Cited

U.S. PATENT DOCUMENTS 9,791,917 B2 * 10/2017 Kamhi ..................... G06F 3/017
10,539,787 B2 * 1/2020 Haddick ............ G02B 27/0093
(Continued)

*Primary Examiner* — Sardis F Azongha
(74) *Attorney, Agent, or Firm* — Nadya Reingard; Yan Hankin

(57) ABSTRACT

The invention refers to devices, intended for impact on virtual objects, namely to devices for impact on virtual objects of augmented reality. The device comprising a one or more video camera, SONAR module, infrared camera, display, connected to the computational module, processing device, the device has a database storage of actions virtual objects of facial expressions, gestures of the user, recognized objects of the real world and distance to such objects. All modules of the device are connected to the computing module that has an electronic unit adapted to select commands stored in the database based upon the information received through various modules of the device. As a result certain actions of virtual objects of augmented reality are activated, and the resulting video stream is shown to the user. According to the invention, the command recognition block further comprises a module for determining heart rate of the user.

8 Claims, 1 Drawing Sheet

US 11,182,976 B2
Page 2

(51) Int. Cl.
*G06F 3/01* (2006.01)
*G02B 27/01* (2006.01)
*G02B 27/00* (2006.01)
*G06T 7/50* (2017.01)

(52) U.S. Cl.
CPC .......... *G06F 3/011* (2013.01); *G06K 9/00255* (2013.01); *G06K 9/00335* (2013.01); *G06T 7/50* (2017.01); *G02B 2027/0178* (2013.01); *G06T 2207/10048* (2013.01)

(58) Field of Classification Search
CPC ........ G06F 3/013; G06F 3/017; G06F 3/0304; G06F 3/0484; G06K 9/00255; G06K 9/00302; G06K 9/00315; G06K 9/00355; G06K 9/00382; G06K 9/00671
See application file for complete search history.

(56) References Cited

U.S. PATENT DOCUMENTS

2014/0098136 A1* 4/2014 Fein .................. G06T 11/00
345/633
2015/0009130 A1* 1/2015 Motta .................. G06F 3/005
345/156
2017/0323482 A1* 11/2017 Coup .................. H04N 13/366
2020/0334908 A1* 10/2020 Wilson .................. G06T 19/006

\* cited by examiner

DEVICE FOR INFLUENCING VIRTUAL OBJECTS OF AUGMENTED REALITY

TECHNICAL FIELD OF THE INVENTION

The invention relates to devices for influencing virtual objects, namely devices for influencing virtual objects of augmented reality, comprising a housing in which a video camera, display, microphone is connected to a computing unit that processes data.

The following terms are used in this paper.

Virtual object—a nonexistent object created by technical means from wherein sensations transmitted to a person (through hearing and vision, etc . . . ) therefrom are simulated by technical means.

Augmented reality—perceived mixed reality created by using the elements "augmented" by the computer perceived reality (where virtual objects are mounted in the perceptual field).

Device for creating and viewing objects augmented reality—any computing device having a display and a video camera, which can transmit the display image from the camera in real time and display additional virtual image. A typical representative of such a device: smartphone, tablet computer, a computer with a headset in the form of points of augmented reality, such as Google Glass and the like.

Smartphone (English a smartphone—Smart phone)—a cell phone, having functionality of a Pocket PC.

Biometric parameters of a face—a set of specific parameters, points on the human face, which may carry by means of image analysis recognition of basic emotions expressed by mimics of a human face such as—joy, sadness, fear, surprise, anger, contempt and repulsion, as well as the signals given by face of a person (wink and stuff).

Biometric parameters gestures—a set of specific parameters, the points of the human body, especially the hands, wherein analyzing images of which allows recognition of signals of human gestures (stroking, parting, shaking, etc.).

SONAR module—sound navigation and ranging device for detecting objects by reflecting a sound wave.

Key points—points determined within the features recognized on objects in the process of object recognition used for improving positioning of the camera with an offset relative to the coordinates of the vertices of the texture coordinate mapping.

PRIOR ART

Currently, an increasing number of people use various electronic devices and interact with virtual objects. This happens not only in computer games, but also in the learning process, as well as, for example, in the remote trade of goods, when the buyer decides to purchase using a virtual model of goods. The most promising direction of development looks like the creation of augmented reality—that is, the combination of the display of the computer device or smart phone and glasses virtual or augmented reality, virtual objects with the real image obtained in real time from a video camera of said device.

Besides simple observation of augmented reality objects, there is a need to interact with them, i.e. to send control signals by different means which lead to the fact that the augmented reality object is responsive to the influence.

There are known devices for influencing virtual augmented reality objects containing a housing in which a video camera and display are connected to a computing unit that processes data. This prior art is disclosed in the publication of a utility model patent of RF No. 138628 20 Mar. 2014

This device is the closest in technical essence and achieved technical result and is chosen as a prototype of the proposed invention. Similarly to the present invention, the prototype may display virtual objects of augmented reality.

The disadvantage of this prototype is its inability to control actions or movements of the augmented reality object, depending on the commands corresponding to the facial expressions and gestures of the user.

DESCRIPTION OF THE INVENTION

The technical problem addressed by the present invention is proposing a device for influencing virtual objects of augmented reality, which, at least, mitigates at least one of the above disadvantages, namely, to extend the possibility of affecting virtual objects of augmented reality by influencing virtual objects of augmented reality by facial expressions and user gestures. Also, the proposed system provides a capability of influencing the augmented reality based upon the input received from a sonar module and infrared camera, thereby allowing to use the system in a low light, and/or low visibility conditions. The SONAR module is used to determine the position of objects in the real world, the distance to such objects and to transmit such information to the computing module of the main apparatus of the present invention. As a result of processing this information, in addition to the reactions of the virtual object to the recognized facial expressions and gestures of the user, the virtual object can respond to the approach or removal of the specified objects, the location of which is determined by the module equipped with SONAR. Also, the information received from the SONAR module can be used to clarify the position of objects in poor visibility conditions, whether or not such objects are recognized based on their image.

To achieve this goal, the system is provided, comprising of an apparatus including hardware modules united by one housing and peripheral devices.

The main apparatus of the system comprising:
1. Input means:
   a. Front-camera
   b. Main cameras
   c. Communication means adapted to receive wireless messages
2. Touch display, monitor or polarized visor
3. Data processing and storage devices
   a. Memory for operational computing
   b. Non-volatile memory
   c. Operational Computing Unit
   d. A block for processing data received from input devices.
   e. Peripheral devices connection block adapted to connect peripheral devices to the main apparatus by a wired or wireless connection.

Peripheral devices that can be connected to the main apparatus may include:
1. Additional input devices
   a. Sonar module
   b. High resolution infrared module
   c. Additional cameras
   d. Microphone
2. Output devices
   a. Projector
   b. Screen
   c. Headphones or other mobile audio output devices d. Communication means adapted to send wireless messages The system software further comprising:
1. Main operating unit
2. Module for connecting internal devices
3. Module for connecting peripheral devices
4. Data storage and retrieval module
5. Module for processing and matching real and virtual spaces
6. Module for recognizing control commands
7. Visual data output module
8. Audio output module The system comprising of elements above functions as described below:

Input Devices

The front camera is designed to scan the user's face, obtain the parameters of the image brightness and the direction of light sources.

The main camera is adapted to receive data about the surrounding physical environment, to obtain a background for broadcasting an augmented reality scene, it can be also used for obtaining parameters of image brightness and revealing the direction of light sources, to calculate key points of the objects and their position in the real world environment. Main camera captures gestures of the user used to control augmented reality objects.

Communication means adapted to send and receive wireless messages is also included into the apparatus. Such messages may be interpreted as commands for the virtual objects of the augmented reality. An apparatus may generate a message if the corresponding command is retrieved from the database based upon the information obtained from modules of the apparatus. Such message may influence virtual objects of augmented reality of other users, as will be explained in greater details below.

Data Display Device

Monitor or display adapted to display processed augmented reality placed over the captured photo or video images of the real world environment.

Data Processing and Storage Devices

Memory for operational computing, or device RAM, is used to store data in the device's short-term memory. Non-volatile memory is intended for storing long term data including databases and files. Operational and computing unit adapted for computing operations and cooperation with other modules of the device, including receiving images, recognizing objects and creating image stream combining the real world background with augmented reality. The block for processing data received from input devices is adapted to receive and pre-process data received from all modules of the system. Peripheral connection block adapted to interconnect the peripheral devices of the system with the data processing and storage modules of the system.

Peripheral Devices

A module determining user heartbeat, pulse and temperature as will be appreciated by a skilled person, can be used. The information collected by such module can be transmitted to the main apparatus via wired or wireless channels.

SONAR module, designed to determine the distance to objects in the real world. It works as an additional system to the main camera and allows to get the exact distance to certain key points and objects due to the directional emission of sound waves and receiving their reflection from the real world object.

The high definition infrared module consists of an infrared emitter and a high definition infrared camera and being used for obtaining high definition depth maps, as it will be appreciated by a skilled person.

Additional cameras can be connected at the user's request and used together with cameras of the main apparatus or replacing them, when used in conjunction with cameras of the main apparatus, the effect of a stereo camera can be achieved.

The microphone is adapted to receive sounds of the surrounding world for subsequent embedding into the augmented reality scene, as well as for use commands from the user towards the augmented reality objects.

The projector adapted to display the processed augmented reality composition on various surfaces, including translucent and with polarized coatings also may be used. Such a projector may replace display or be used in conjunction with the display.

The display is intended for displaying the processed augmented reality composition and may comprise various devices, including virtual reality glasses or helmet.

Headphones or other mobile audio output devices adapted to output sounds from augmented reality scene which may be combined with the sounds of the real world environment.

Description of Software Modules Functionality

The main operating module consists of an operating system and is designed to provide basic user interaction with the main apparatus. Software module for connecting internal devices, this is the part of the operating module responsible for connecting to the operating module of internal modules of the main apparatus.

Software module for connecting peripheral devices is part of the operating module responsible for connecting peripheral devices to the operating module, differs from the module for connecting internal devices in that it has the ability to connect an arbitrary device using a set of drivers and programs of the connected device.

The data storage and retrieval software module is responsible for working with data at various levels of the operating module, data coming from input modules and transferring data to display modules.

The software module for processing and comparing real and virtual objects is adapted to calculate the relative position of objects in real world and augmented reality environments.

The software module for recognizing control commands, receives at the input various commands from input devices, recognizes them based upon the databases and other algorithms pre-loaded into the memory of the main apparatus and converts them into commands for the module for processing and comparing real and virtual spaces.

The visual data output software module is intended for rendering visual data of the processing module and comparing real and virtual spaces.

The audio data output module is designed to output the audio data of the processing and comparison module of real and virtual spaces.

According with the description provided above, the main apparatus has a storage unit comprising a database of actions of virtual objects of augmented reality correlated with various commands corresponding to certain predetermined options of facial expressions and user gestures, coupled to the computing module which includes an electronic recognition unit for the various options of facial expressions and gestures of a user, received through the camera of the device, commands from the database, wherein the output of the recognition unit is connected to an input of the electronic unit, located in the computing module, which activates corresponding actions of virtual objects of augmented reality associated to recognized commands corresponding to various embodiments of facial expressions and gestures of the user. The main apparatus can be connected to a SONAR module, as described above. Said module is used to determine the position of objects in the real world, the distance to such objects and transmits such information to the computing module of the device. As a result of processing of this information, in addition to the reactions of the virtual object to the recognized facial expressions and gestures of the user, the virtual object can respond to the approach or removal of the specified objects, the location of which is determined by the module equipped with SONAR. Also, the information received from the specified SONAR module can be used to clarify the position of objects in poor visibility conditions. For example, the commands for the augmented reality objects can be generated based upon a combination of facial expression of the user and determined position of the real world object that is being recognized.

Thanks to these advantageous characteristics, it becomes possible to manage the objects of augmented reality by mimicry and user gestures in conjunction with the determined positions of the real world objects.

Depending on the facial expression, gestures, the virtual object of augmented reality will perform actions corresponding to the specified command. For example, a virtual dog in augmented reality will lie down following the gesture of an outstretched hand facing downwards. A virtual person in augmented reality based on a recognized smile of the user will smile in response. A virtual kitten in augmented reality will murch when stroked by hand. Also, a virtual object such as a kitten may react to a real world object being moved close to the apparatus, as determined by the SONAR module. The reaction of the kitten to the such object may be based on combination of the type of object if it is recognized, the distance to the object and the mimics of the user seeing the object. In this scenario the kitten may be either afraid of the object or be happy to see it.

In another scenario, the main apparatus may be used in low visibility conditions, for example by a fireman when participating in a rescue operation. The main apparatus may be integrated into a fireman's helmet, the frontal camera may read the facial expression of the fireman. In this case, the projector may be used to project the image on translucent visor with polarized coatings. Based upon the detected facial expression, in conjunction with the visibility characteristics received by the cameras and proximity of the objects, a command influencing virtual objects of the augmented reality may be generated such that the user is alarmed and directed to get outside the area, and the augmented reality image showing the way out based upon the determined position of the real objects would guide the user to a safe exit. The position of the real world objects may be determined using SONAR module and infrared camera, as described above. In addition, other firemen may get a wireless messages that would influence augmented reality objects displayed to them to show them a way to the fireman in need of help.

There is an embodiment of the invention in which the recognition unit of facial expressions and gestures and commands of the user has a module for recognizing the biometric parameters of the face. Thanks to this advantageous characteristic, it becomes possible to define, among the user's facial expressions, certain facial expressions that are in the database and which allow to form the corresponding commands that correspond to this user's facial expressions, said commands influencing virtual objects of augmented reality.

There is also an embodiment of the invention in which the recognition unit for facial expressions and gestures and commands of the user has a biometric gesture recognition module. With this favorable characteristic it is possible to detect user gestures among certain gestures that are in the database, and that allow them to generate corresponding commands that correspond to the gestures of the user for influencing the virtual objects of augmented reality.

There is also an embodiment of the invention, wherein the recognition unit for facial expressions and gestures and commands of the user command has a module for detecting temperature coupled with an infrared camera or thermal imager. In this case, objects of augmented reality can react to the temperature of the surrounding world, for example, at a temperature of minus twenty degrees on the street, they depict that they freeze or turn into an icicle.

Due to this advantageous characteristic, it becomes possible to determine the temperature of individual areas of the user's body, mainly faces. This in turn allows us to determine the distribution of "hot" and "cold" areas, in comparison of their localization. A quantitative estimate can also be made to determine the temperature difference (gradient) indices of the investigated area in comparison with the symmetric zone. Also, mathematical processing of the image can be performed. Orienters in the analysis of the image can serve universal features of the face: the eyebrow, the ciliary edge of the eyelids, the contour of the nose.

There is also an embodiment of the invention in which the recognition unit for facial expressions, gestures and commands of the user has a module for determining frequency of blinking of the user's eyes. Thanks to these advantageous characteristics, it becomes possible to recognize certain combinations of the blinkings of the eyes that are stored in the database and which can be interpreted as certain commands, for example, a wink with one or two eyes. Or one can track the movement of the eyeball, allowing even users with impaired motor functions to enter commands using gestures performed by movement of the eyes.

There is still a further embodiment of the invention in which the recognition unit for facial expressions, gestures and commands of the user has a module for determining a heart rate of the user.

Thanks to these advantageous characteristics, it is possible to additionally determine the heart rate and use it to improve the accuracy of recognition of the basic emotions expressed by facial expressions of the person, such as joy, sadness, fear, surprise, anger, and so on. In the example described above involving a fireman, heart rate and pulse, eye blinking frequency of the user can supplement the facial expression of the user when determining whether or not augmented reality objects must direct a user to an exit or a message to other users requesting help and influencing virtual objects of augmented reality displayed to such users needs to be sent.

In addition, there is an embodiment of the invention, wherein recognition unit for facial expressions, gestures and commands of the user has a user action prediction module.

Thanks to this advantageous characteristic, it becomes possible to recognize user's facial expressions and gestures in real time, that is, even before the end of the gesture process. For example, the user just started to smile, as the module predicts the user's actions and automatically sends a signal that the user's smile is detected even before the smile itself is formed.

BRIEF DESCRIPTION OF THE DRAWINGS

Other features and advantages of the present invention clearly follow from the description given below for illustration, which is not restrictive, with references to the attached drawings, wherein.

Figure 1:
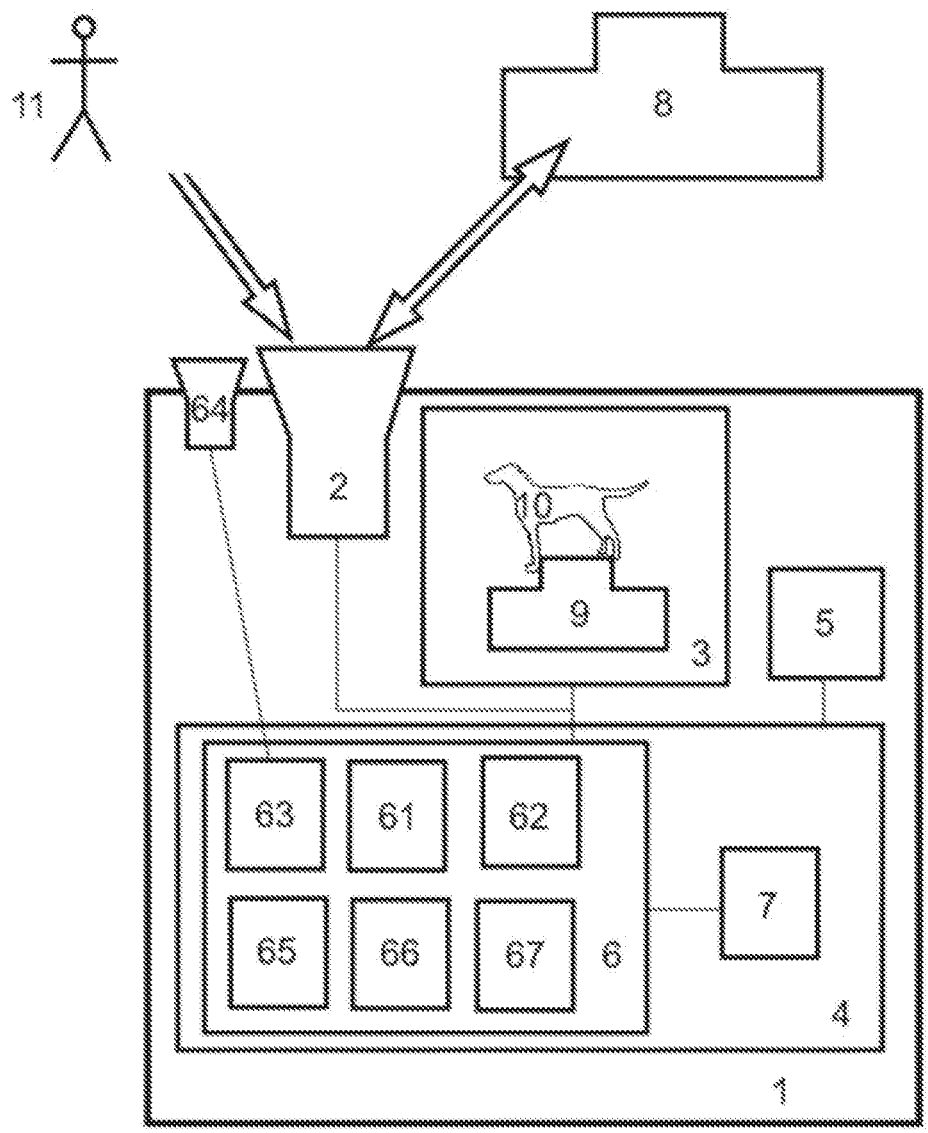
FIG. 1 is a schematic diagram of an apparatus for influencing the virtual objects of augmented reality according to the invention, FIG. 2 schematically shows steps of a method of influencing the virtual objects of augmented reality according to the invention.

According to FIG. 1 a device for influencing virtual objects of augmented reality comprises a housing 1, which accommodates a video camera 2, a display 3, connected to the computing unit 4 for processing data.

The device has a database unit for storing actions of virtual objects of augmented reality correlated with various commands, corresponding to certain variants of predetermined facial expressions and gestures of a user, said database unit connected to a computing unit 4, which comprises an electronic recognition unit 6 for correlating commands in the database with various facial expressions and gestures of the user, received from the video camera 2 of the device, wherein the output of the recognition unit 6 is connected to the input of the electronic unit 7 for activating actions of the virtual reality objects corresponding to the recognized commands corresponding to various facial expressions and gestures of the user The user facial expression, gestures and commands recognition unit 6 may have:
  a biometric face recognition module 61,
  a biometric gestures recognition module 62
  a user temperature determination module 63 coupled with an infrared camera 64 (or imager)
  a user eye blink frequency detection unit 65,
  a user heart rate determination unit 66,
  a user actions prediction unit 67.

FIG. 1 also indicates:
  8—a real object that the camcorder 2 shoots,
  9—an image of a real object on the display 3,
  10—an image of a virtual object of augmented reality on the display 3,
  11—a user.

DETAILED DESCRIPTION OF THE INVENTION

The device for influencing virtual objects of augmented reality works as follows. Here is the most comprehensive example of the invention, bearing in mind that this example does not limit the invention.

Figure 2:
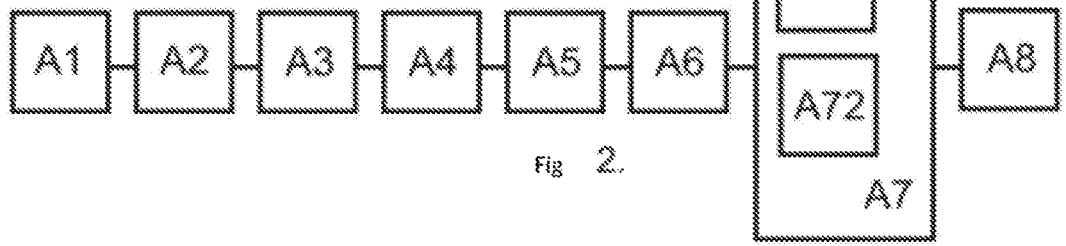

According to FIG. 2:

Step A1. Form a database of actions of virtual objects of augmented reality correlated with various commands corresponding to various embodiments, facial expressions and gestures of the user, as well as objects of the real world and the distance to them before beginning influencing virtual objects of augmented reality.

Step A2. Establishing in advance a correspondence between the facial expressions and gestures of the user and recognized objects of the real world and distance to them and the variant of the actions of the augmented reality object.

Step A3. Locating any image in the field of view of the video camera of the device to create and view virtual objects augmented reality, said image serving as a marker for creating virtual objects augmented reality or a physical object.

Step A4. Creating an augmented reality object and display it on the device's display.

Step A5. The user shows facial expressions and gestures that are available in the database.

Step A6. The device takes an image of the user's face or his gesture. Accordingly, capture of a video from the camera 2 is performed.

Step A7. Then, by recognition unit, among the various received through the video camera of the device facial expressions and user gestures, recognizing commands from the database, said recognition is real time oriented; It also may recognize physical objects in the camera's and/or infrared camera field of view and determines the distance to them using the SONAR module.

Process of recognition of facial expressions, physical objects and distances to such objects may consist of several sub-steps.

Step A71. First, digital images are pre-processed to improve recognition quality.

Step A72. Then, a person's face is detected in a panoramic image and the person's image is copied to a separate frame, which is fed to a classifier's input. Physical objects are also detected in separate frames, which are also fed to the input of the classifier. A neural network algorithm trained by backpropagation can be used as the classifier. The training set can comprise seven standards of the Ekman classifier, wherein mimic pictures are significantly different in expression strength. In addition to object recognition, the SONAR module obtains the distance to the recognized physical object. User's physical conditions such as heartrate and pulse are being detected.

Step A8. With the help of the electronic unit 7, the actions of virtual objects of augmented reality corresponding to the recognized commands corresponding to various facial expressions and gestures of the user, as well as recognized objects, distance to such objects and user physical conditions are activated.

The apparatus can be trained, ie. new gestures can be added to the database.

To place objects of augmented reality on real objects (for example, on a table), the following operations can be performed:

1. Identifying markers of real three-dimensional space from the images obtained from the video camera of the device adapted to create and view the augmented reality. In general, a marker can be any shape or object. But in practice, we are limited by the resolution of the web-camera (phone), color rendering, lighting, and processing power of the equipment, as everything happens in real time, and therefore must be processed quickly, and therefore usually a black and white marker of simple form is selected.

2. Forming a physical base coordinate system tied to the spatial position of the markers of a real three-dimensional space.

3. Setting coordinates of the three-dimensional virtual objects of augmented reality in the base coordinate system.

4. Determining coordinates of the device adapted to create and view the augmented reality relative to the basic coordinate system by analyzing the image from the camera of the device.

The sequence of stages is exemplary and allows one to rearrange, subtract, add or perform some operations simultaneously without losing the ability to interact with virtual objects of augmented reality.

INDUSTRIAL APPLICABILITY

The proposed device for influencing virtual objects of augmented reality can be implemented by a person skilled in the art and, when implemented, ensures the realization of the claimed designation, which makes it possible to conclude that the criterion "industrial applicability" for the invention is met.

In accordance with the present invention, a prototype device is manufactured. The prototype tests showed that it allows:

determining among a variety of options of facial expressions and gestures of the user, those options that correspond to certain predefined facial expressions and gestures of the user that are pre-stored in the database, determining in the database of the sequence of actions of the augmented reality object corresponding to a certain gesture or facial expressions of the user, performing said sequence of actions corresponding to a certain gesture or facial expressions of the user, on an object of augmented reality.

Implementation embodiment 1. A virtual dog created as an object of augmented reality licks hands when a user is trying to pet it. See FIG. 1.

Implementation embodiment 2. A flower created as an object of augmented reality blooms when recognizing joy and fade when recognizing sorrow on the user's face.

Implementation embodiment 3. A virtual man created as an object of augmented reality waves it's hand as a greeting or farewell in response to recognizing gestures of greeting or farewell of the user.

Implementation embodiment 4. The main apparatus may be integrated into a fireman's helmet, the frontal camera reads the facial expression of the fireman. The projector used to project the augmented reality image on translucent visor with polarized coatings. Based upon the facial expression, and physical condition of the fireman the apparatus conclude, for example, that the user has to be directed to the exit, and the augmented reality image showing the way out based upon the determined position of the real objects guides the user to a safe exit.

Accordingly, this invention addresses the technical problem set-expansion of capability to interact with virtual reality objects by influencing said virtual objects of augmented reality by user's mimicry and gestures and distance to recognized and other physical objects of the real world.

What is claimed is:

1. A device for influencing virtual objects of augmented reality comprising at least:
    a housing,
    one or more cameras (2) adapted to capture facial expressions, gestures of a user, (11) and physical objects;
    a display (3),
    a computing module (4),
    a memory,
    a recognition unit (6) adapted to recognize facial expression and gestures of the user (11) and physical objects,
    a module adapted to determine a pulse and a heart rate of the user (11);
    a SONAR module adapted to determine distances to physical objects,
    an infrared camera,
    a peripheral devices connection block,
    said device is adapted to:
        capture images from the one or more camera (2) and the infrared camera,
        recognize physical objects in a field of view of the one or more cameras (2) and infrared camera,
        determine distance to physical objects with use of the SONAR module, recognize facial expressions and gestures of the user (11),
        determine heartbeat of the user (11),
        determine surrounding environment temperature,
        determine visibility characteristics of surrounding environment, and
        select a command for the virtual objects (10) of augmented reality based on combination of:
        the recognized facial expressions of the user (11),
        the recognized gestures of the user (11),
        the pulse and heartbeat of the user (11),
        the recognized physical objects,
        the determined distance to corresponding physical objects,
        the determined surrounding environment temperature, and
        the determined visibility characteristics.

2. The device of claim 1, wherein the memory includes a database (5) storing actions of the virtual reality objects (10) of augmented reality correlated with commands corresponding to facial expressions, gestures of the user (11), recognized physical objects and distances to corresponding physical objects.

3. The device of claim 2, further comprising a projector and a surface with polarized coating, wherein said projector is adapted to display image of virtual objects of augmented reality on said surface.

4. The device of claim 3, wherein said surface with polarized coating is a visor of a helmet.

5. The device of claim 1, wherein the recognition unit (6) further comprises at least one of:
    a module (61) adapted for recognizing biometric parameters of a face of the user (11),
    a module (62) adapted for recognizing biometric parameters of gestures of the user (11),
    a module (63) adapted for determining temperature of the user (11) connected to an infrared camera (64) or a thermal imager, a user eye blinking frequency detection unit (65), and a user action prediction unit (67).

6. The device of claim 1, wherein the one or more camera (2) comprises a front camera adapted to scan a face of the user (11), obtain parameters of the image brightness and the direction of light sources.

7. The device of claim 1 wherein the one or more camera (2) comprises a main camera adapted to receive data about the surrounding physical environment, obtain a background for broadcasting an augmented reality scene, obtain parameters of image brightness and direction of light sources, and calculate key points of physical objects and their position in space, wherein said main camera is further adapted to capture gestures of the user (11).

8. The device of claim 1 further comprising a communication means adapted to send and receive wireless messages, said wireless messages adapted to be interpreted as commands for the virtual objects of augmented reality.

\* \* \* \* \*